Dec. 31, 1940.   R. C. KIRCHHOFF   2,226,865
MINIMUM PRESSURE RELAY
Filed Nov. 18, 1939
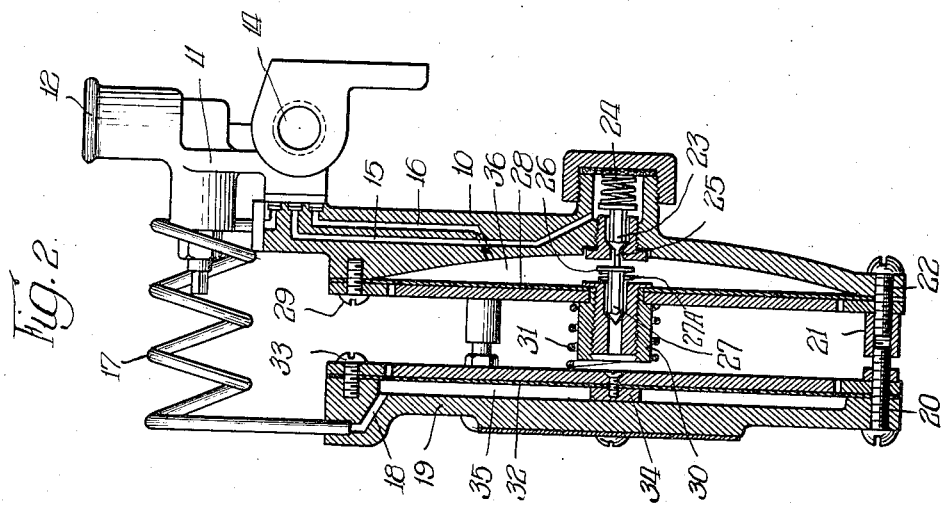
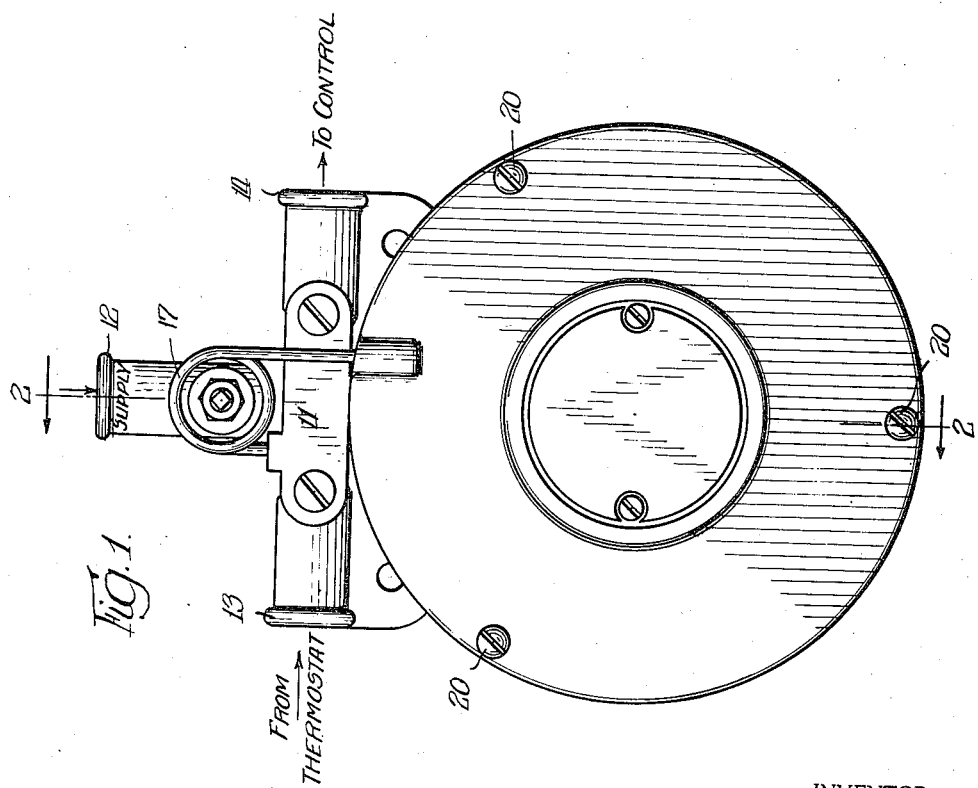
INVENTOR.
Richard Carl Kirchhoff,
BY
ATTORNEY.

Patented Dec. 31, 1940

2,226,865

UNITED STATES PATENT OFFICE 2,226,865

MINIMUM PRESSURE RELAY

Richard Carl Kirchhoff, Chicago, Ill., assignor to The Powers Regulator Company, Chicago, Ill., a corporation of Illinois Application November 18, 1939, Serial No. 305,125

2 Claims. (Cl. 137—153)

My invention relates to a gradually-acting, minimum-pressure relay, particularly adapted for the control of pneumatically actuated temperature or moisture control systems.

An object of the invention is to provide an instrument by means of which a certain predetermined minimum pressure can be maintained on control apparatus regardless of the action of the thermostat. This is necessary in certain heating and ventilating apparatus where intake or proportioning dampers are operated by air through the influence of a thermostat, it being required that during normal operation such dampers shall not be entirely closed, regardless of the temperature. For example, in the class rooms of schools it is a requirement in many jurisdictions that a certain specified minimum volume of fresh air shall be introduced at all times. Thus by providing a relay of the character herein disclosed between the thermostat and the damper, a certain minimum pressure may be delivered at all times in order to maintain the damper in its minimum open position.

A relay of the character described should have certain characteristics, an important one being that it shall deliver its minimum specified pressure regardless of the delivery to the instrument of any pressure from the thermostat of less than the specified minimum; in other words, that the relay shall not cumulate its minimum pressure with any pressure delivered by the thermostat. It is essential also that as the pressure from the thermostat builds up beyond the minimum it will operate in the same manner as any relay that did not possess the minimum pressure characteristics.

For simplicity the instrument illustrated herein is shown as of constant ratio. It will be understood, however, that the same principle may be applied to variable ratio instruments with equal facility. Further, it will be understood that no attempt has been made to illustrate any accurate actual position of the various valves or other parts of the instrument; this for the reason that the movements of the parts are very slight even from one extreme to the other and the valves are of such small size that illustrations of actual positions would be practically impossible.

The invention will be more readily understood by reference to the accompanying drawing; in which, Fig. 1 is a face view of an instrument such as contemplated herein; and, Fig. 2 is a sectional view on the line 2—2 of Fig. 1.

The device comprises a casing 10 to which is attached a fitting 11 providing three pipe connections 12, 13, 14. The connection 12 is intended to supply air from a source under pressure of fifteen pounds, this and the other pressures mentioned herein being chosen as examples. The connection 13 is for a pipe communicating with a thermostat of the type in which air under pressure is passed as the temperature surrounding the instrument exceeds that of the setting of the instrument. The connection 14 is for a pipe extending to a damper or other control apparatus.

The connection 12 communicates with a passage 15 in the casing. The connection 14 is to a passage 16 and the connection 12 is through a coiled pipe 17 to a passage 18 in a face plate 19.

The casing and the face plate are separated as shown and held in spaced relation by means of screws 20, three of which are arranged around the periphery of the face plate, the screws engaging in sleeves 21 that are in turn held by screws 22 extending through the rim of the casing. By turning the screws 20, the spacing of the face plate relative to the casing may be changed.

Air under pressure admitted through the connection 12 and the passage 15 is controlled by a valve 23 normally held against its seat by a spring 24, the valve having an axial extension 25 in abutting relation with the head 26 of an exhaust valve 27. A light spring 27a tends to unseat the exhaust valve. The exhaust valve is part of an assembly carried by a diaphragm 28, the periphery of which is held against the rim of the casing by screws 29. The assembly includes a sleeve 30 over which is mounted a stiff coiled spring 31. The spring at its outer end bears against the plate of a second diaphragm 32, the sleeve 30 being normally out of engagement with the plate of said last named diaphragm. The diaphragm 32 is held by means of screws 33 at the periphery of the face plate 19 and a button 34 at the center of the diaphragm prevents collapse of the diaphragm against the end wall of the face plate.

It will be noted that the space 35 enclosed by the diaphragm 32 is in communication, through the duct 18 and pipe 17, with the thermostat, while the space 36 is, through the duct 16 and connection 14, in communication with the control apparatus.

In case a variable ratio instrument is required, the effective diameter of the diaphragm 28 will be reduced or increased in order to bring about the desired result.

In operation, assuming that a supply of air at fifteen pounds is delivered to the supply connection 12 and that a minimum pressure of four pounds is desired to be delivered at all times through the duct 16 to the control apparatus, the screws 20 are so adjusted that the face plate is moved inwardly, transmitting pressure through the spring 31 to deflect the diaphragm 28 to the extent of closing the exhaust valve 27 and slightly opening the intake inlet valve 23. The instrument will continue to deliver pressure of four pounds so long as there is a supply of air under pressure. Of course, when it is desired to shut down the system at night or at other times, mere shutting off of the air supply and exhausting the pressure in the system will result in complete closing of the dampers that had theretofore been maintained in at least a partially open position.

Assuming that the control thermostat is set for 35 degrees, no air will be passed from that instrument to the chamber 35 until the temperature exceeds 35 degrees. Thereafter as the temperature rises additional air will be delivered to the chamber 35 and up to four pounds pressure no change will take place in the delivery of air by the instrument to the control apparatus; this for the reason that four pounds of pressure is likewise being exerted against the diaphragm 28. However, as the pressure from the thermostat rises above four pounds, the diaphragm 32 will be moved inwardly compressing the spring 31 and exerting pressure against diaphragm 28 tending to bring about a slightly greater opening of the inlet valve 23 to an extent that pressure will be admitted to exactly balance that exerted against the diaphragm 32. This will continue up to the full pressure available and on the reduction of pressure delivered by the thermostat a corresponding reduction will occur in the control line; this for the reason that whenever the pressure exerted against the diaphragm 28 exceeds that exerted against the diaphragm 32, the spring 31 will be compressed, thus permitting an exhaust of air to bring about equalization. When the pressure delivered from the thermostat reaches four pounds, the diaphragm 32 will remain in a fixed position with the button 34 against the face plate and regardless of further reduction in thermostat pressure the instrument will continue to deliver four pounds to the control apparatus.

The form of the heat sensitive element and of the damper control means is of no importance herein and such parts are not illustrated. The description is predicated on the use of a so-called "direct-acting" thermostat; that is, one that passes air on an increase in temperature. It will be understood however, that a reverse acting thermostat may be used with a reversal of the action of the relay. Also, that the described instrument is adapted for use in systems in which it is desired to limit damper positions in hot as well as cold weather.

I claim:

1. In a relay of the class described, the combination of a casing providing two inlets and an outlet, one inlet providing for a supply of air at a substantially constant pressure, a valve for controlling the inlet of said constant supply of air, a diaphragm supported on said casing and enclosing a space in communication through said outlet with control apparatus, an exhaust valve carried by the diaphragm in thrust engagement with said inlet valve, a face plate supported on and spaced from said casing, a second diaphragm carried by the face plate and enclosing a space, a flexible pipe connecting said space to said second inlet, a spring between said diaphragms tending to spread apart the same and to maintain the exhaust valve in closed position and the inlet valve in a predetermined open position in the absence of pressure behind said second diaphragm, and screw means adapted to adjust the position of the face plate relative to the casing and consequently the compression of the spring between said diaphragms.

2. In a relay of the class described, the combination of a casing providing two inlets and an outlet, one inlet providing for a supply of air at a substantially constant pressure, a valve for controlling the inlet of said constant supply of air, a diaphragm supported on said casing and enclosing a space in communication through said outlet with control apparatus, an exhaust valve carried by the diaphragm in thrust engagement with said inlet valve, a face plate supported on and spaced from said casing, a second diaphragm carried by the face plate and enclosing a space, a flexible pipe connecting said space to said second inlet, a spring between said diaphragms tending to spread apart the same and to maintain the exhaust valve in closed position and the inlet valve in a predetermined open position in the absence of pressure behind said second diaphragm, and screw means acting on the spring between said diaphragms whereby to vary the compression thereof and consequently the degree of fixed opening of the inlet valve.

RICHARD CARL KIRCHHOFF.